US008954611B2

(12) United States Patent
Chan et al.

(10) Patent No.: US 8,954,611 B2
(45) Date of Patent: *Feb. 10, 2015

(54) MECHANISM FOR SHARING STATES OF APPLICATIONS AND DEVICES ACROSS DIFFERENT USER PROFILES

(71) Applicant: Nextbit Systems Inc., San Francisco, CA (US)

(72) Inventors: Michael A. Chan, San Francisco, CA (US); Daniel R. Bornstein, San Francisco, CA (US); Linda Tong, San Francisco, CA (US)

(73) Assignee: Nextbit Systems Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,674

(22) Filed: Apr. 14, 2014

(65) Prior Publication Data

US 2014/0289333 A1    Sep. 25, 2014

Related U.S. Application Data

(63) Continuation-in-part of application No. 14/221,174, filed on Mar. 20, 2014.

(60) Provisional application No. 61/804,134, filed on Mar. 21, 2013.

(51) Int. Cl.
| G06F 15/16 | (2006.01) |
| A63F 13/30 | (2014.01) |
| H04L 29/06 | (2006.01) |
| H04L 29/08 | (2006.01) |

(52) U.S. Cl.
CPC ............... *A63F 13/12* (2013.01); *H04L 63/08* (2013.01); *H04L 67/06* (2013.01)
USPC ............ 709/248; 709/203; 709/224; 709/227

(58) Field of Classification Search
USPC .......... 709/203, 204, 217, 224, 227, 228, 248
See application file for complete search history.

(56) References Cited

U.S. PATENT DOCUMENTS

| 6,811,486 B1 | 11/2004 | Luciano, Jr. |
| 7,315,740 B2 | 1/2008 | Maes |
| 7,326,117 B1 | 2/2008 | Best |

(Continued)

OTHER PUBLICATIONS

Notice of Allowance mailed May 14, 2014, Co-pending U.S. Appl. No. 14/158,715, by Quan et al., filed Jan. 17, 2014.

(Continued)

*Primary Examiner* — Ramy M Osman
(74) *Attorney, Agent, or Firm* — Perkins Coie LLP

(57) ABSTRACT

At least one embodiment of this disclosure includes a method of sharing application states across different user profiles. The method can include: receiving a request from a first computing device associated with a first user profile to load an application state of a target application, wherein the application state is owned by a second user profile; verifying permission for the first user profile to load the application state owned by the second user profile; configuring a sharing instance of the application state of the target application by accessing application data of the application state associated with the second user profile in a storage service; and sending the sharing instance to be loaded onto the first computing device.

30 Claims, 11 Drawing Sheets

(56) References Cited

U.S. PATENT DOCUMENTS

| | | |
|---|---|---|
| 7,774,457 B1 | 8/2010 | Talwar et al. |
| 7,903,383 B2 | 3/2011 | Fukano et al. |
| 8,005,956 B2 | 8/2011 | Williams et al. |
| 8,234,348 B1 | 7/2012 | Tulchinsky et al. |
| 8,315,977 B2 | 11/2012 | Anand et al. |
| 8,423,511 B1 | 4/2013 | Bhatia |
| 8,438,298 B2 | 5/2013 | Arai et al. |
| 8,473,577 B2 | 6/2013 | Chan |
| 8,475,275 B2 | 7/2013 | Weston et al. |
| 8,478,816 B2 | 7/2013 | Parks et al. |
| 8,494,576 B1 | 7/2013 | Bye et al. |
| 8,495,129 B2 | 7/2013 | Wolman et al. |
| 8,515,902 B2 | 8/2013 | Savage |
| 8,539,567 B1 | 9/2013 | Logue et al. |
| 8,589,140 B1 | 11/2013 | Poulin |
| 8,606,948 B2 | 12/2013 | Evans et al. |
| 8,747,232 B1* | 6/2014 | Quan et al. .............. 709/217 |
| 8,764,555 B2* | 7/2014 | Quan et al. .............. 463/24 |
| 8,775,449 B2* | 7/2014 | Quan et al. .............. 707/757 |
| 8,812,601 B2* | 8/2014 | Hsieh et al. .............. 709/206 |
| 8,840,461 B2* | 9/2014 | Quan et al. .............. 463/24 |
| 2001/0039212 A1 | 11/2001 | Sawano et al. |
| 2005/0147130 A1 | 7/2005 | Hurwitz et al. |
| 2006/0030408 A1 | 2/2006 | Kiiskinen |
| 2006/0073788 A1 | 4/2006 | Halkka et al. |
| 2007/0130217 A1 | 6/2007 | Linyard et al. |
| 2008/0055311 A1 | 3/2008 | Aleksic et al. |
| 2008/0220878 A1 | 9/2008 | Michaelis |
| 2009/0063690 A1 | 3/2009 | Verthein et al. |
| 2009/0077263 A1 | 3/2009 | Koganti et al. |
| 2009/0106110 A1 | 4/2009 | Stannard et al. |
| 2009/0204966 A1 | 8/2009 | Johnson et al. |
| 2010/0173712 A1 | 7/2010 | Buhr |
| 2010/0235511 A1 | 9/2010 | Kai |
| 2010/0257403 A1 | 10/2010 | Virk et al. |
| 2010/0332401 A1 | 12/2010 | Prahlad et al. |
| 2011/0078319 A1* | 3/2011 | Ishida .............. 709/228 |
| 2011/0093567 A1 | 4/2011 | Jeon et al. |
| 2011/0126168 A1 | 5/2011 | Ilyayev |
| 2011/0252071 A1 | 10/2011 | Cidon |
| 2011/0275316 A1 | 11/2011 | Suumäki et al. |
| 2011/0286026 A1 | 11/2011 | Matsuzawa |
| 2012/0017236 A1 | 1/2012 | Stafford et al. |
| 2012/0023250 A1 | 1/2012 | Chen et al. |
| 2012/0028714 A1 | 2/2012 | Gagner et al. |
| 2012/0036218 A1* | 2/2012 | Oh et al. .............. 709/217 |
| 2012/0036239 A1 | 2/2012 | Donaghey et al. |
| 2012/0079095 A1 | 3/2012 | Evans et al. |
| 2012/0079126 A1 | 3/2012 | Evans et al. |
| 2012/0084803 A1 | 4/2012 | Johansson et al. |
| 2012/0110568 A1 | 5/2012 | Abel et al. |
| 2012/0149309 A1 | 6/2012 | Hubner et al. |
| 2012/0171951 A1 | 7/2012 | 't Hooft |
| 2012/0203932 A1 | 8/2012 | da Costa et al. |
| 2012/0210343 A1 | 8/2012 | McCoy et al. |
| 2012/0303778 A1 | 11/2012 | Ahiska et al. |
| 2012/0311820 A1 | 12/2012 | Chang |
| 2013/0007203 A1 | 1/2013 | Szu |
| 2013/0008611 A1 | 1/2013 | Marcus et al. |
| 2013/0044106 A1 | 2/2013 | Shuster et al. |
| 2013/0045795 A1 | 2/2013 | Fiedler |
| 2013/0086114 A1 | 4/2013 | Wilson et al. |
| 2013/0117806 A1 | 5/2013 | Parthasarathy et al. |
| 2013/0159890 A1 | 6/2013 | Rossi |
| 2013/0219381 A1 | 8/2013 | Lovitt |
| 2013/0223240 A1 | 8/2013 | Hayes et al. |
| 2013/0225087 A1* | 8/2013 | Uhm .............. 455/41.3 |
| 2013/0304898 A1 | 11/2013 | Aggarwal et al. |
| 2014/0040239 A1 | 2/2014 | Hirsch |
| 2014/0053054 A1* | 2/2014 | Shen et al. .............. 709/205 |
| 2014/0101300 A1 | 4/2014 | Rosensweig et al. |
| 2014/0170978 A1* | 6/2014 | Wolman et al. .............. 455/41.2 |

OTHER PUBLICATIONS

Non-Final Office Action mailed Jun. 9, 2014, for U.S. Appl. No. 14/167,939 by Quan, J., et al., filed Jan. 29, 2014.
Restriction Requirement mailed Jun. 12, 2014, for U.S. Appl. No. 14/251,463 by Quan, J., et al., filed Apr. 11, 2014.
Co-Pending U.S. Appl. No. 14/267,823 by Chan, M.A., et al., filed May 1, 2014.
Co-Pending U.S. Appl. No. 14/160,444 by Quan, J., et al., filed Jan. 21, 2014.
Co-Pending U.S. Appl. No. 14/167,939 by Quan, J., et al., filed Jan. 29, 2014.
Co-Pending U.S. Appl. No. 14/228,190 by Quan, J., et al., filed Mar. 27, 2014.
Co-Pending U.S. Appl. No. 14/251,463 by Quan, J., et al., filed Apr. 11, 2014.
Co-Pending U.S. Appl. No. 14/042,567 by Chan, M.A., et al., filed Sep. 30, 2013.
Co-Pending U.S. Appl. No. 14/042,509 by Chan, M.A., et al., filed Sep. 30, 2013.
Co-Pending U.S. Appl. No. 14/042,398 by Chan, M.A., et al., filed Sep. 30, 2013.
Co-Pending Design U.S. Appl. No. 29/486,424 by Chan, M.A., et al., filed Mar. 28, 2014.
Co-Pending U.S. Appl. No. 14/221,174 by Chan, M.A., et al., filed Mar. 20, 2014.
International Search Report and Written Opinion mailed Feb. 3, 2014, 7 pp., for International Application No. PCT/US13/62729 filed Sep. 30, 2013.
International Search Report and Written Opinion mailed Feb. 3, 2014, 9 pp., for International Application No. PCT/US13/62986 filed Oct. 2, 2013.
International Search Report and Written Opinion mailed Feb. 3, 2014, 7 pp., for International Application No. PCT/2013/62737 filed Sep. 30, 2013.
Non-Final Office Action mailed Apr. 3, 2014, U.S. Appl. No. 14/158,682 by Quan, J., et al., filed Jan. 17, 2004.
Non-Final Office Action mailed Apr. 2, 2014, U.S. Appl. No. 14/179,709 by Quan, J., et al., filed Feb. 13, 2014.
Non-Final Office Action mailed Mar. 7, 2014, Co-pending U.S. Appl. No. 14/158,715, by Quan et al., filed Jan. 17, 2014.
Non-Final Office Action mailed Mar. 10, 2014, Co-pending U.S. Appl. No. 14/173,680, by Quan et al., filed Feb. 5, 2014.
Notice of Allowance mailed Apr. 15, 2014, Co-pending U.S. Appl. No. 14/167,834, by Quan et al., filed Jan. 29, 2014.
Notice of Allowance mailed May 20, 2014, Co-pending U.S. Appl. No. 14/173,680, by Quan et al., filed Feb. 5, 2014.
Non-Final Office Action mailed May 27, 2014, U.S. Appl. No. 14/158,733 by Quan, J., et al., filed Jan. 17, 2014.
Non-Final Office Action mailed May 8, 2014, U.S. Appl. No. 14/179,744 by Quan, J., et al., filed Feb. 13, 2014.
Non-Final Office Action mailed May 9, 2014, U.S. Appl. No. 14/160,444 by Quan, J., et al., filed Jan. 21, 2014.
Co-Pending U.S. Appl. No. 13/772,163 by Quan, J., filed Feb. 20, 2013.
Co-Pending U.S. Appl. No. 14/043,034 by Chan, M.A., et al., filed Oct. 1, 2013.
Co-Pending U.S. Appl. No. 14/158,682 by Quan, J., et al., filed Jan. 17, 2004.
Co-Pending U.S. Appl. No. 14/179,709 by Quan, J., et al., filed Feb. 13, 2014.
Co-Pending U.S. Appl. No. 14/158,715 by Quan, J., et al., filed Jan. 17, 2014.
Co-Pending U.S. Appl. No. 14/173,680 by Quan, J., et al., filed Feb. 5, 2014.
Co-Pending U.S. Appl. No. 14/167,834 by Quan, J., et al., filed Jan. 29, 2014.
Co-Pending U.S. Appl. No. 14/179,744 by Quan, J., et al., filed Feb. 13, 2014.
Co-Pending U.S. Appl. No. 13/865,515 by Quan, J., et al., filed Apr. 18, 2013.
Co-Pending U.S. Appl. No. 14/158,733 by Quan, J., et al., filed Jan. 17, 2014.

(56) References Cited

OTHER PUBLICATIONS

Final Office Action mailed Jul. 24, 2014, U.S. Appl. No. 14/179,709 by Quan, J., et al., filed Feb. 13, 2014.
Final Office Action mailed Nov. 6, 2014, U.S. Appl. No. 14/158,682 by Quan, J., et al., filed Jan. 17, 2004.
International Search Report mailed Sep. 11, 2014, 7 pps., for International Application No. PCT/2013/031488 filed Mar. 21, 2014.
Layton, J.B., "User Space File Systems," Linux Magazine, accessed at http://www.linux-mag.com/id/7814, Jun. 22, 2010, pp. 1-4.
Non Final Office Action mailed Nov. 3, 2014, for U.S. Appl. No. 13/772,163 by Quan, J., filed Feb. 20, 2013.
Non-Final Office Action mailed Aug. 26, 2014, for U.S. Appl. No. 14/267,823 by Chan, M.A., et al., filed May 1, 2014.
Notice of Allowance mailed Aug. 12, 2014, U.S. Appl. No. 14/179,709 by Quan, J., et al., filed Feb. 13, 2014.
Notice of Allowance mailed Sep. 3, 2014, U.S. Appl. No. 14/160,444 by Quan, J., et al., filed Jan. 21, 2014.
U.S. Appl. No. 14/479,087 by Chan, M.A et al., filed Sep. 5, 2014.
U.S. Appl. No. 14/479,140 by Chan, M.A et al., filed Sep. 5, 2014.

* cited by examiner

MECHANISM FOR SHARING STATES OF APPLICATIONS AND DEVICES ACROSS DIFFERENT USER PROFILES

CROSS-REFERENCE TO RELATED APPLICATION(S)

This application is a continuation-in-part of U.S. patent application Ser. No. 14/221,174, entitled "MECHANISM FOR SHARING STATES OF APPLICATIONS AND DEVICES ACROSS DIFFERENT USER PROFILES," filed on Mar. 20, 2014, which claims the benefit of U.S. Provisional Patent Application No. 61/804,134, entitled "OPERATING SYSTEM AND DEVICE INTEGRATED WITH CLOUD COMPUTING FUNCTIONALITIES," filed on Mar. 21, 2013, all of which are incorporated by reference herein in their entirety.

This application is related to U.S. patent application Ser. No. 13/772,163, entitled "APPLICATION STATE SYNCHRONIZATION ACROSS MULTIPLE DEVICES," which was filed on Feb. 20, 2013, which is incorporated by reference herein in its entirety.

This application is related to U.S. patent application Ser. No. 14/042,398, entitled "INTERFACE FOR RESOLVING SYNCHRONIZATION CONFLICTS OF APPLICATION STATES," which was filed on Sep. 30, 2013, which is incorporated by reference herein in its entirety.

RELATED FIELDS

At least one embodiment of this disclosure relates generally to cloud computing and, in particular, to mobile device based cloud computing.

BACKGROUND

Application state data is data used to record the running status of a computer application. One example of application state data is a "game save" for a game application. A game save is a piece of digitally-stored information about the progress of a user operating the game application. The game save can be reloaded later to the same or another device, so that the user can continue where he/she stopped. The user instructs the game application to generate a game save (i.e., save the game) to prevent the loss of progress in the game, especially when the user is interrupted or ending a game session.

Sharing game saves among users has been common for many years. Originally, by swapping memory cards with game saves, users could help each other to unlock features in a game application. Now, users can upload their game saves from their devices to Internet servers. By downloading a game save from an Internet server, a user can continue the progress of the game on the device used to play the game or another device such as a computer, game console, or smart phone. However, to achieve the goal of continuing the progress on another device, the user needs to deliberately instruct the device to save the game progress (i.e., game save) and to upload the game save to a server or a memory card. Then the user needs to download the game from the server or the memory card to the other device and then instruct the other device to load the game save. In such cases, the whole process is tedious and requires many user interventions; furthermore, the process only works for game applications that are specifically designed with game saving functionalities.

DISCLOSURE OVERVIEW

Techniques introduced here provide an application state sharing mechanism between user profiles (e.g., implemented as separate user accounts). For example, different user profiles can lend application states to each other. An application state is configured with application data (e.g., gameplay data of a computer game application) associated with a time point and a first instance of a target application (e.g., the computer game application) installed on a first computing device. That is, when the application data in the application state is loaded in another device other than the first computing device, the other device can configure and run another instance of the target application as if the first instance of the target application that was running at the time point is continuing to run on the other device without any appearance of time lapse within a user environment (e.g., a user interface) that was provided by the target application. In some embodiments, the other device can run the same operating system as the first computing device. In other embodiments, the other device can run a different operating system or a different version of the same operating system than the first computing device. In these embodiments, an application state broker system can transform the application state to configure a sharing instance of the application state compatible with the different operating system or the different version of the same operating system. The application state broker system can store mapping functions that transform an application state from one version of an operating system to another version or type of operating system. That is, the mapping functions can be used to facilitate the transformation of the application state to ensure compatibility.

In some embodiments, user profiles can share application states within the same computing device. In other embodiments, user profiles can share application states across multiple devices. The disclosed techniques can be implemented through a cloud computing system with multiple computing devices, each with a synchronization agent and an app-share agent. Through these agents and a cloud storage service, the cloud computing system can provide an application sharing platform for user profiles to share application states with each other.

For example, a first user can simply select a target computer application and a target user and, with a click of a button (e.g., via a user interface generated by the app-share agent), load the most recent application state of the target computer application from the target user's devices. This application state sharing mechanism enables a user to conveniently load application states from other users. For example, this sharing mechanism can execute without the target user's manual retrieval of the application state and without having to iterate through multiple devices of the target user to identify the most recent application state at the time the application state request is made by the first user. In some embodiments, the first user can load the application state to his/her device without an explicit approval from the target user for the specific application state request. In one example, the first user can requests, from a first computing device under his/her control, to load an application state of a target computer application installed on a second computing device under a second user's control.

The synchronization agent in a computing device (e.g., the second computing device in the above example) can update application states with a cloud storage service (e.g., a centralized cloud service, a distributed cloud service, or a peer-to-peer cloud service) regularly (e.g., in accordance with a pattern) or upon demand. The peer-to-peer cloud service can be implemented by computing nodes in a peer-to-peer network running instances of a decentralized operating system. In one specific example of the peer-to-peer cloud service, the computing device may be a computing node in the peer-to-peer network. In another example, the computing device is outside of the peer-to-peer network.

When the synchronization agent updates, the application states can be determined either by the synchronization agent (e.g., by monitoring activity in the application) and/or by the cloud storage service (e.g., by monitoring requests for the application states). For example, the synchronization agent can determine to update when a pre-determined progress in the target computer application has been reached or when the target computer application is paused or has gone idle (e.g., from lack of user interaction). For another example, the cloud storage service can trigger an update of an application state when a request for the application state is made by another computing device. The cloud storage service can then distribute application states to the computing devices within the cloud computing system to ensure that the computing devices have consistent copies of applications managed by the cloud computing system.

For example, the synchronization agent can detect an instance of a target computer application running at or at least installed on the computing device and determine an update event is in order. The update event is a process of making a copy of application state data of the target computer application. The application state data represents an application state of the target computer application at the update event. The synchronization agent can then transmit the application state data of the target computer application to the cloud storage service in response to the update event. The application state data and any relevant metadata associated with the application state data can be stored on the cloud storage service as the application state of the target computer application.

Based on the above application state updating technique, another computing device (e.g., the first computing device in the above example) can thus later retrieve the application state of the target computer application from the cloud storage service and restore an instance of the target computer application to the application state using the application state data and any related metadata. The update event executed by the synchronization agent can proceed automatically in the background of an operating system of the computing device. That is, the update event can be transparent to the user. The update event can also be transparent to the target computer application.

The app-share agent in a computing device (e.g., the first computing device in the above example) can facilitate a first user to load an application state of a target computer application from a computing device (e.g., the second computing device in the above example) of a second user. As discussed above, the loading of the application state can occur without interactions with the second computing device when the first computing device sends a request to copy the application state associated with the second user. The app-share agent can send a request to the cloud storage service to retrieve the application state associated with the second user. The cloud storage service can match the request to application state data associated with the most recent application state or whichever application state is requested. The cloud storage service can then verify that the first user is permitted to load the application state to the first computing device of the first user.

In various embodiments, the cloud storage service can transform application states stored in the cloud storage service when a requesting device operates a different version of operating system than the operating system from which the original target computer application was running on. For example, a synchronization agent can save an application state of a computer game running on one version of the Android™ operating system in the cloud storage service. Then, a user operating a Windows phone can request the application state. In some embodiments, the cloud storage service can transform application state data associated with the application state of the computer game prior to sending it to the Windows phone to make the application state compatible with the Windows operating system.

In some embodiments, the second computing device can serve as the cloud storage service. That is, the app-share agent of the first computing device can request an application state directly from the second computing device. For example, an instance of the app-share agent in the second computing device can implement a service to respond to application state requests from external computing devices.

If the target computer application is not installed on the first computing device, the app-share agent can first request the user download the target computer application. The app-share agent can load the application state whether or not the target computer application expects the application state to be loaded. In some cases, the target computer application receives the application state data from the app-share agent and provides at least part of the logics to load the application state. In other cases, the target computer application is paused or terminated, in which case, the app-share agent can load the application state data into portions of an operational memory associated the target computer application.

In embodiments, after the sharing of the application state, the synchronization agent can back up a new and updated application state of the target computer application on the first computing device associated with the first user (e.g., the computing device that loaded a foreign application state) to the cloud storage service. In some embodiments, the cloud storage service can back up the new application state as a new set of application state data independent of the original application state data associated with the second user. In other embodiments, the cloud storage service can re-integrate the new application state data to the original application state data associated with the second user.

Some embodiments of this disclosure have other aspects, elements, features, and steps in addition to or in place of what is described above. These potential additions and replacements are described throughout the rest of the specification.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
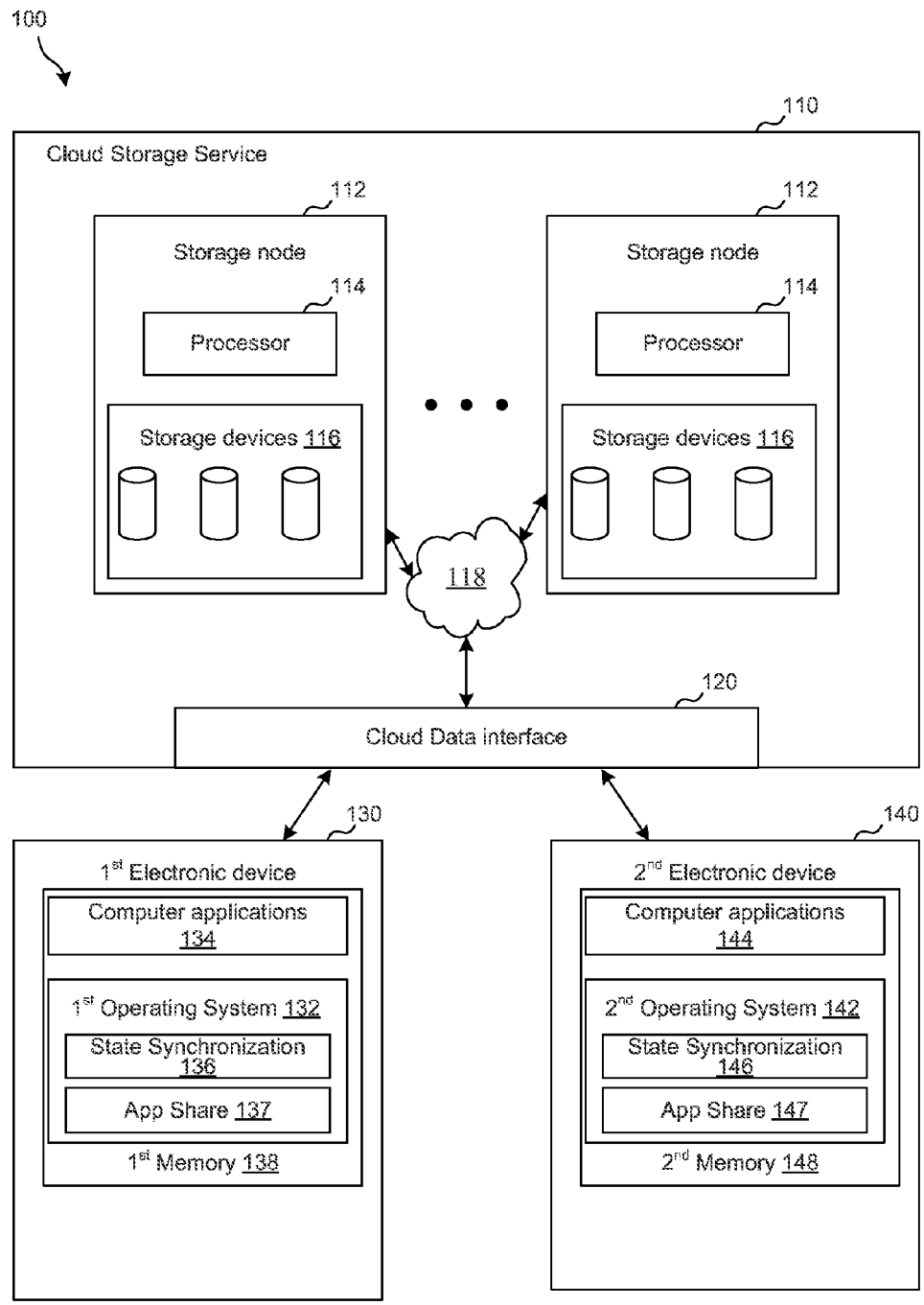
FIG. 1 is a block diagram of an example of a cloud computing system for application state sharing between user profiles, in accordance with various embodiments.

FIG. 1 is a block diagram of an example of a cloud computing system 100 for application state sharing between user profiles, in accordance with various embodiments. The cloud computing system 100 provides a state sharing platform to enable different user profiles to share application states. The cloud computing system 100 includes a cloud storage service 110 configured to store and manage application states and to load application states to different computing devices. In one embodiment, the cloud storage service 110 can be a device cluster having storage nodes 112 interconnected with each other by a storage network channel 118. The device cluster can communicate with other computing devices via a global network, such as the Internet, a local network, or a cloud data interface 120.

The cloud storage service 110 includes the storage nodes 112. Each of the storage nodes 112 includes one or more processors 114 and storage devices 116. The storage devices can include optical disk storage, RAM, ROM, EEPROM, flash memory, phase change memory, magnetic cassettes, magnetic tapes, magnetic disk storage, or any other computer storage medium which can be used to store the desired information.

The cloud storage service 110 can implement the cloud data interface 120 to receive data from and send data to computing devices (e.g., a first electronic device 130 and a second electronic device 140). The computing devices can include desktop computers, laptop computers, tablet computers, automobile computers, game consoles, smart phones, personal digital assistants, other computing devices capable of running computer applications, or any combination thereof. The cloud data interface 120 can be coupled to network communication hardware and network connection logic to receive the information from the computing devices. For example, the cloud data interface can be coupled to a local area network (LAN), wide area network (WAN) or the Internet. The cloud data interface 120 may include a queuing mechanism to organize data updates received from or sent to the computing devices. In some embodiments, the cloud data interface 120 is implemented by one or more computing devices different from the storage nodes 112. In other embodiments, the cloud data interface 120 is implemented by a subset or all of the storage nodes 112.

In embodiments, the cloud data interface 120 can be implemented such that existence of individual computing devices that implement the cloud data interface 120 is transparent to a client (e.g., the first electronic device 130 or the second electronic device 140). In embodiments, the cloud data interface 120 and the cloud storage service 110 can be implemented such that existence of the storage nodes 112 that store the client data is transparent to a client (e.g., the first electronic device 130 or the second electronic device 140) of the cloud data interface 120.

The electronic devices (e.g., the first electronic device 130 and the second electronic device 140) can share data amongst each other via the cloud storage service 110. For example, the cloud storage service 110 can maintain one or more application states for one or more applications of one or more electronic devices.

The cloud storage service 110 can maintain an application state database of the application states. The application state database can maintain timestamps of when each of the application states is captured and/or when it is collected. The application state database can maintain different snapshots of application states belonging to the same user account and the same application at different times. Each of the application states can be associated with one or more user profiles, with at least one of the user profiles being an owner of the application state. An owner is a user account having complete rights to the application state. An owner can configure the permission settings of the application state (e.g., who can copy and load the application state). The application state database can maintain these associations between the user profiles and the application states. The application state database can also maintain a list of computing devices that have currently loaded one of the application states, the list including specific application states that each computing device has loaded.

The first electronic device 130 includes a first operating system 132 to manage the hardware resources of the first electronic device 130 and to provide services for running computer applications 134 on the first electronic device 130. The first electronic device 130 can send application data of the computer applications 134, representative of a current application state, to the cloud storage service 110. The first electronic device 130 includes at least a first memory 138 to store the computer applications 134 and the application data associated therewith.

The computer applications 134 can include applications for general productivity and information retrieval, including email, calendar, contacts, news, and stock market and weather information. The computer applications 134 can also include applications in other categories, such as mobile games, file sharing, playing music, media streaming, media creation, media editing, automation, navigation and location-based services, banking, e-reader, order-tracking, ticket purchases, or any combination thereof.

The first memory 138 includes a state synchronization module 136 to update and synchronize the application states with the cloud storage service 110. The first electronic device 130 can execute the state synchronization module 136 on the first operating system 132 or as part of the first operating system 132. The first memory 138 further includes an application share module 137 to facilitate requests between user accounts to share an application state.

Similarly, the second electronic device 140 includes a second memory 148. The second memory 148 includes a second operating system 142, which may be the same or different from the first operating system 132. The second memory 148 can include computer applications 144. The second memory 148 can also include a state synchronization module 146 and an application share module 147 performing the same functionality as the state synchronization module 136 and the application share module 137, respectively. For example, the state synchronization modules 136 and 146 can share a set of source codes further compiled into different binary executables for their respective operating systems. The application share modules 137 and 147 can also share a set of source codes further compiled into different binary executables for their respective operating systems. At least one of the computer applications 144 can overlap with the computer applications 134, such that the application state of the overlapped application can be shared between the first electronic device 130 and the second electronic device 140.

In some embodiments, the cloud storage service 110 can determine when to commit an application state of the first electronic device 130 or the second electronic device 140 to the cloud storage service 110. In other embodiments, the electronic devices 130 and 140 themselves can determine when to commit an application state to the cloud storage service 110. For example, when an application state of the first electronic device 130 is scheduled to be committed to the cloud storage service 110, the first electronic device 130 can send an update message to the cloud storage service 110. To generate the update message, the first electronic device 130 can capture a current application state (e.g., as a set of application data) of one of the computer applications 134 running on the first electronic device 130. The first electronic device 130 can either include the application data of the current application state in the update message or a differential mapping of the application data in the update message. The differential mapping represents the difference between the current application state and the previous application state most recently sent to the cloud storage service 110.

The cloud storage service 110 can provide an interface with the state synchronization modules 136 and 146 to facilitate concurrent updates from one or more of the computer applications 134 and 144. The cloud storage service 110 can determine a current application state of a target application shared across multiple user accounts and/or across multiple electronic devices even when there are multiple conflicting updates (e.g., by prioritizing ranks amongst the conflicting updates and re-integrating them based on the prioritized ranks). The cloud storage service 110 can distribute the current application state to the electronic devices having an instance copy of the target application. The cloud storage service 110 can schedule this distribution so that all electronic devices maintain a consistent instance copy of the application state.

In some embodiments, the electronic devices 130 and 140 do not communicate with each other directly during synchronization. For example, the cloud storage service 110 can perform the synchronization by routing the application state updates from one electronic device to another. In other embodiments, the electronic devices 130 and 140 can directly send application state updates to each other with instructions from the cloud storage service 110 that determines which instance copy to update.

Although FIG. 1 illustrates the first electronic device 130 and the second electronic device 140 as being outside of the cloud storage service 110, in some embodiments, the first electronic device 130 and the second electronic device 140 are part of the cloud storage service 110. For example, the first electronic device 130 or the second electronic device 140 can serve as one of the storage nodes 112. As another example, the first electronic device 130 and/or the second electronic device 140 can implement the cloud data interface 120. In embodiments, the cloud storage service 110 can be implemented by electronic devices so that each implements an instance of the state synchronization module 136. Although FIG. 1 illustrates two electronic devices (e.g., the electronic devices 130 and 140), a person having ordinary skill in the art will readily understand that the technology disclosed herein can be applied to data synchronization among more than two computing devices.

Figure 2:
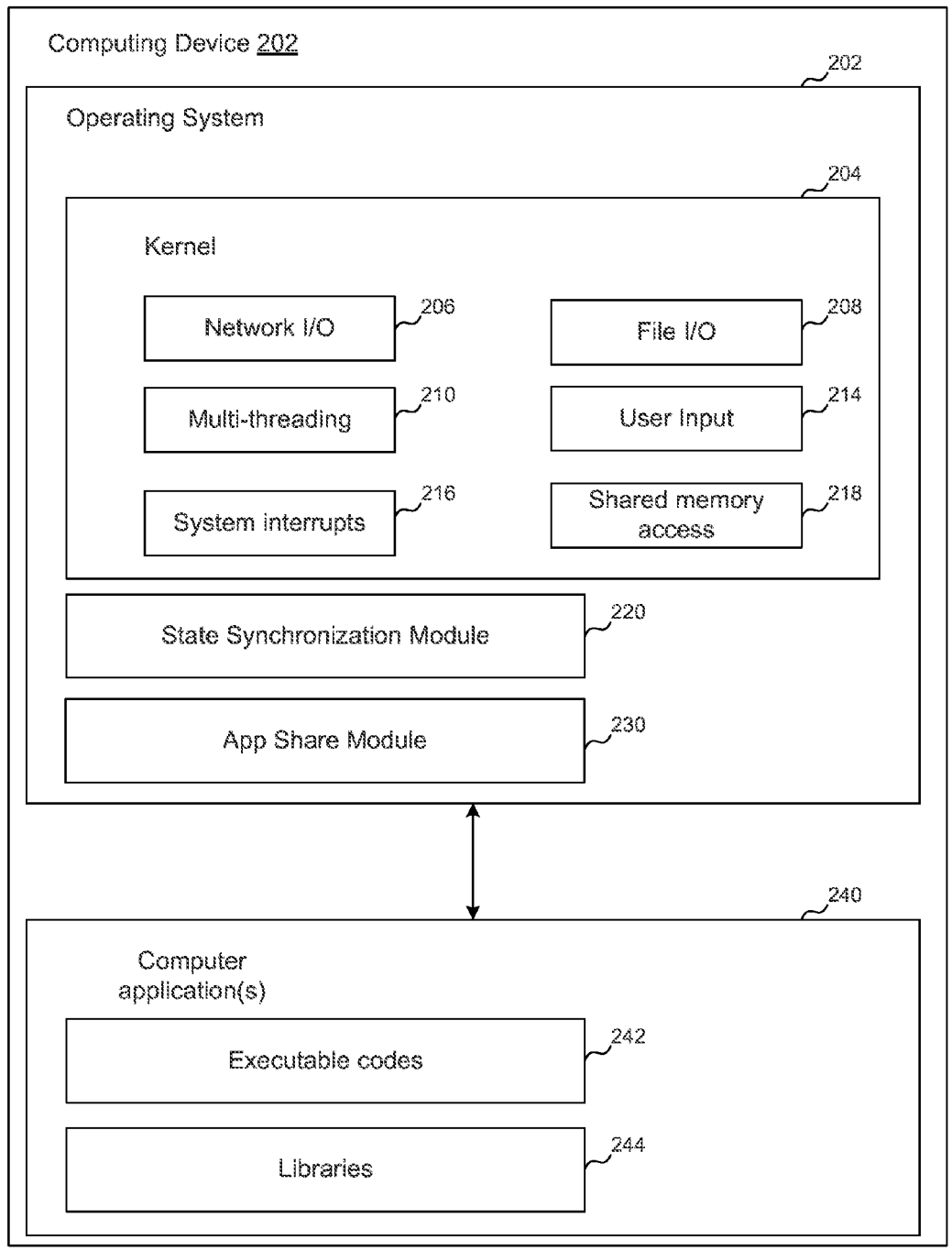
FIG. 2 is a block diagram of an example of a system architecture of a computing device, in accordance with various embodiments.

FIG. 2 is a block diagram of an example of a system architecture of a computing device 200, in accordance with various embodiments. The computing device 200 can implement an operating system 202. The operating system 202 includes a kernel 204. The kernel 204 provides interfaces to hardware of the computing device 200 for computer applications 240 running on top of the kernel 204 and, on occasions, supervises and controls the computer applications 240. The kernel 204 isolates the computer applications 240 from the hardware. The kernel 204 may include one or more intervening sources that can affect execution of the computer applications 240. In one embodiment, the kernel 204 includes a network I/O module 206, a file I/O module 208, a multi-threading module 210, a user input module 214, a system interrupts module 216, and a shared memory access module 218.

The computer applications 240 can reference and utilize one or more libraries 244 that are accessible through the operating system 202. The libraries 244 can be referenced directly by executable codes 242 of the computer applications 240. A "library" is a collection of instructions that generate a well-defined interface by which software instruction behaviors can be invoked. A library can be linked or loaded to a computer application at the start of the execution of the computer application or in the middle of the execution. Some of the computer applications 240 may also include other instruction frameworks or packages that becomes part of the executable codes 242.

At least a portion of the logic behind the cloud computing system (i.e., the resource sharing platform) can be implemented in one or more modules running on the operating system 202 or as part of the operating system 202. The state synchronization module 220 can be a synchronization agent (e.g., the state synchronization modules 136 and 146 of FIG. 1) discussed above. The application share module 230 can be the app-share agent (e.g., the application share modules 137 and 147 of FIG. 1) discussed above as well.

The state synchronization module 220 can be one of the computer applications 240. The state synchronization module 220 can be at least partly implemented in the executable codes 242. The state synchronization module 220 can also be at least partly implemented by one of the libraries 244 and/or the operating system 202. For example, the state synchronization module 220 can initialize and run a background process on the operating system 202. In embodiments, the state synchronization module 220 can run a service accessible within the operating system 202 and/or across a network.

Similarly, the application share module 230 can be one of the computer applications 240. The application share module 230 can be at least partly implemented in the executable codes 242. The application share module 230 can also be at least partly implemented by one of the libraries 244 and/or the operating system 202. For example, the application share module 230 can initialize and run a background process on the operating system 202. In embodiments, the application share module 230 can run a service accessible within the operating system 202 and/or across a network.

The modules described herein can be implemented as instructions on a tangible storage memory capable of being executed by a processor or a controller. The tangible storage memory may be volatile or non-volatile memory. In some embodiments, the volatile memory may be considered "non-transitory" in the sense that it is not transitory signal. Modules may be operable when executed by a processor or other computing device, e.g., a single chip board, application specific integrated circuit, a field programmable gate array, a network capable computing device, a virtual machine hosting device, a cloud-based device, or any combination thereof. Memory spaces and storages accessible to the modules can be implemented with tangible storage memory as well, including volatile or non-volatile memory.

Each of the modules may operate individually and independently of other modules. Some or all of the modules may be executed by different computing components. The separate computing components can be coupled through one or more communication channels (e.g., wireless or wired channels) to coordinate their operations. Some or all of the modules may reside on different memory devices. Some or all of the modules may be combined as one component or module.

A single module may be divided into sub-modules, each sub-module performing a separate method step or method steps of the single module. In some embodiments, at least some of the modules share access to a memory space. For example, one module may access data accessed by or transformed by another module. The modules may be considered "coupled" to one another if they share a physical connection or a virtual connection, directly or indirectly, allowing data accessed or modified from one module to be accessed in another module.

Figure 3:
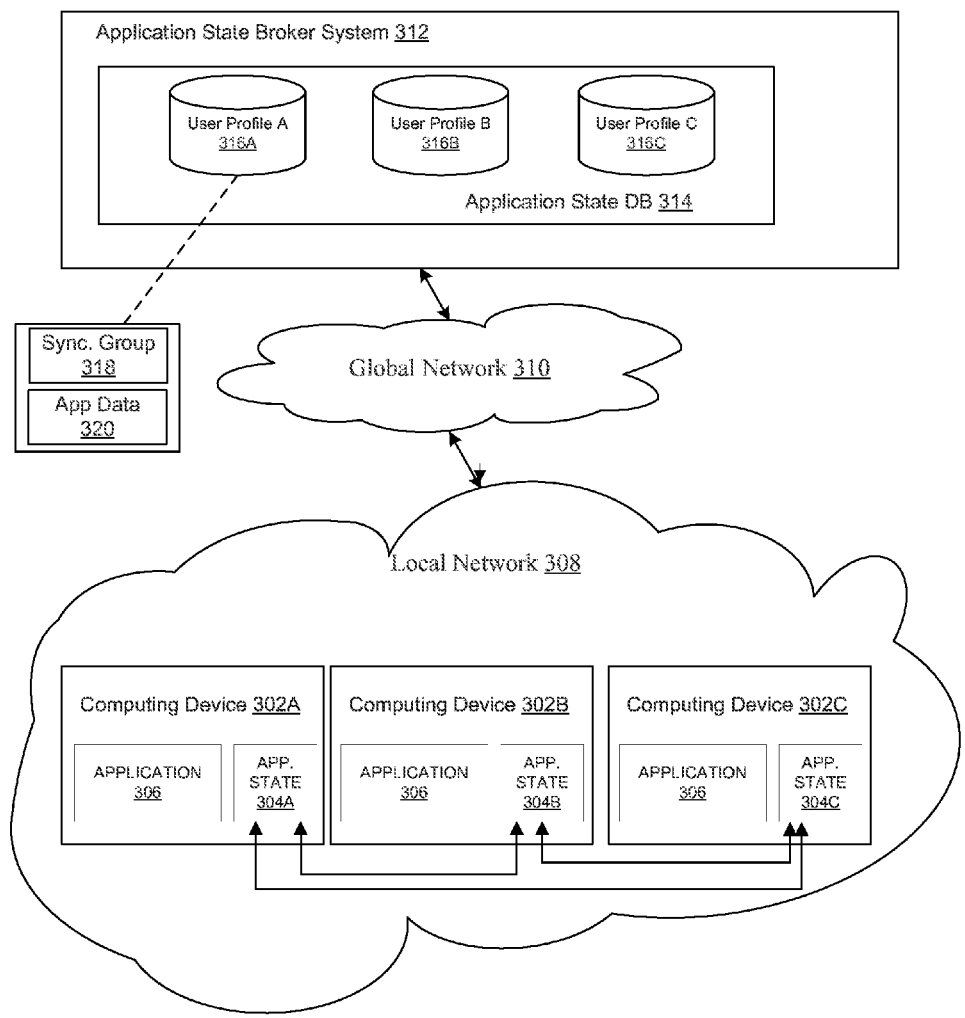
FIG. 3 is a block diagram of an example environment for application state sharing between computing devices, in accordance with various embodiments.

FIG. 3 is a block diagram of an example environment for application state sharing between computing devices (e.g., a computing device 302A, a computing device 302B, and a computing device 302C, collectively as the "computing devices 302"), in accordance with various embodiments. In some embodiments, the computing devices 302 can share application states (e.g., an application state 304A, an application state 304B, and an application state 304C, collectively as the "application states 304") for an application 306 directly amongst each other. The application states 304 can be shared within a local network 308 (as illustrated) or across a global network 310.

In other embodiments, the computing devices 302 share the application states 304 amongst each other via an application state broker system 312 (e.g., the cloud storage service 110 of FIG. 1). The application state broker system 312 may be connected to the computing devices 302 via the global network 310. The application state broker system 312 can maintain an application state database 314. The application state database 314 can maintain various user-specific application datasets (e.g., an application dataset 316A for a user profile A, an application dataset 316B for a user profile B, and an application dataset 316C, collectively as the "application datasets 316").

Each of the application datasets 316 can include a synchronization group 318. The synchronization group 318 is a list of computing devices owned by the same user profile (e.g., the user profile A). Computing devices within the synchronization group 318 can maintain one or more consistent instances of one or more computer applications. Each of the application datasets 316 can include application data 320. The application data 320 can represent one of the application states 304. For example, a state synchronization agent (e.g., the state synchronization module 220 of FIG. 2) or an app-share agent (e.g., the application share module 230 of FIG. 2) can use the application data 320 to load one of the application states 304 to a device running the application 306 at a different state than the specific one of the application states 304.

In embodiments where the computing devices 302 share the application states 304 amongst each other via the application state broker system 312, the application data 320 in one of the application datasets 316 can be loaded onto a device that is not listed in the synchronization group 318. For example, the synchronization group 318 of the application dataset 316B may consist of the computing device 302A and the computing device 302B. However, an app-share agent can request the application state broker system 312 to load the application data 320 of the application dataset 316B into the computing device 302C.

Figure 4:
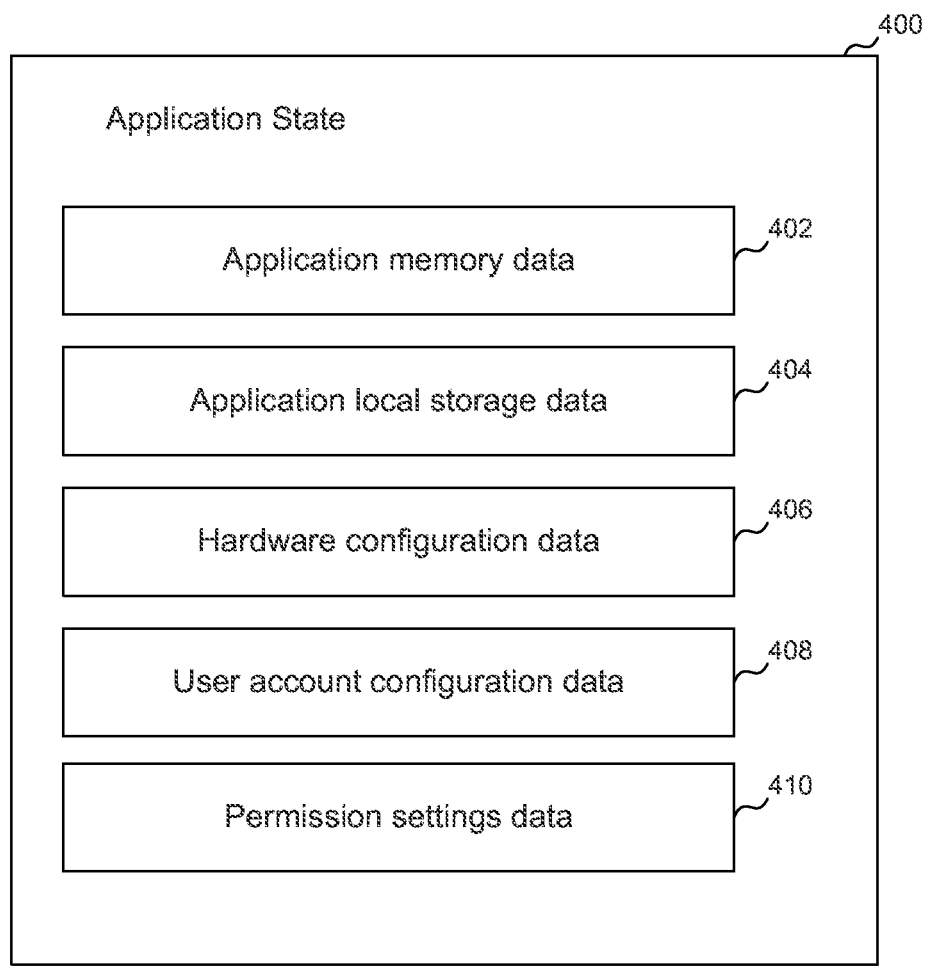
FIG. 4 is a block diagram of an example of an application state of a computer application, in accordance with various embodiments.

FIG. 4 is a block diagram of an example of an application state 400 of a computer application (e.g., one of the computer applications 134, 144, or 244), in accordance with various embodiments. The application state 400 can be represented by application state data, such as the application data 320 of FIG. 3. For instance, application state data can be organized as files and synchronized between the computing devices via a cloud storage service (e.g., the cloud storage service 110 of FIG. 1 or the application state broker system 312 of FIG. 3)

In various embodiments, one or more modules of the operating system of the computing device are responsible for organizing, monitoring, and synchronizing the application state 400. Such modules can run in the computing devices as background services or programs. The computer applications can be developed without any code dedicated to the organization, monitoring, or synchronization of the application state data. The application state data maintained by the operating system includes sufficient information for the operating system to restore a previous snapshot of the application state 400 specified by the application state data.

The application state 400 of a computer application may include application memory data 402, application local storage data 404, hardware configuration data 406, user account configuration data 408, permission settings data 410, or any combination thereof. The application state 400 may also include other functional memory portions or configurations that is specific to a type of computer application. For example, when the application state 400 is configured to store a runtime state of a computer game, the application state 400 can include game progress data, game control configuration, multimedia output configuration including display configuration and speaker configuration, network configuration, virtual character attribute data, virtual property data, virtual finance or accounting data, or any combination thereof.

The application memory data 402 describes an operational state of an operational memory of the computer application. For example, the operational memory can be a portion of a volatile memory (e.g., random access memory or a processor cache) in the computing device that the computer application is running on. For another example, the operational memory can be a portion of a flash memory in the computing device. The operational memory dynamically evolves throughout the execution of the computer application. The application local storage data 404 represents certain data in a local storage of the computing device that the computer application running on. The application local storage data 404 can change based on specific instructions from the computer application to write to a persistent storage device. For example, the local storage can be a portion of a persistent storage device, such as a hard disk or a flash drive.

The hardware configuration data 406 represents how hardware components within the computing device when the computer application is executing. For instance, the hardware configuration data 406 can include a current device sound volume level and a screen brightness level when the computer application is running. The user account configuration data 408 represents a user's preferences and choices regarding the computer application and/or the operating system environment for running the computer application based on previous user inputs. For instance, the user account configuration data 408 may include information about the user's language preference. Assuming the computer application is a game supporting both English and Chinese languages for user interface in the game, the language preference can be the user's selection of the English language as the preferred language.

The permission settings data 410 represents restrictions on who can load the application state 400 and how the application state 400 can be loaded or shared (i.e., loaded onto a device logged in by a user profile who is not an owner of the application state 400). For example, the permission settings data 410 includes a listing of user profiles that can load the application state 400 and/or a list of user profiles that are not allowed to load the application state 400. As another example, the permission settings data 410 can reference a social network account such that only "friends" of the social network account can load the application state 400.

The permission settings data 410 can indicate a number of attributes of how the application state 400 can be shared. The application state 400 can be shared as a "session share," such that the application state 400 expires after a predetermined amount of time (e.g., from the time of loading the application state 400) or after a precondition for expiration occurs (e.g., the user reaches a certain game level if the computer application is a computer game). The application state 400 can be shared as a "partial share," such that only part of the application state 400 is loaded. For example, a partial share of the application state 400 can include only sharing of the hardware configuration data 406. The application state 400 can be shared as a "transferable share," such that the user profile that receives the application state 400 can further share the application state 400 to a third user profile. The application state 400 can be shared as a "separable share," such that the user profile that receives the application state 400 can maintain a separate application state different from the application state 400 in the cloud storage service once the application state 400 is loaded on to a device of the receiver user profile. The application state 400 can be shared as a "modifiable share," such that future updates and changes to the application state 400 after it is loaded can be synchronized and re-integrated back into the application state 400 in the cloud storage service.

The application state 400 can be shared as a "complete transfer share," such that the owner of the application state 400 is changed to the receiver user profile, and the original owner of the application state 400 loses any control or privilege over the application state 400 in the cloud storage service. The application state 400 can be shared as a "co-ownership share," such that the application state 400 becomes co-owned by the original owner and the receiver user profile. In some embodiments, the application state 400 can include one or more of the above attributes. For example, a transferable sharing of the application state 400 can be a modifiable share as well, where the sharing includes synchronizing of every copy of the application state 400 (e.g., devices of the receiver user profile and the third user profile are added to the synchronization group 318 of the original owner).

In some embodiments, the permission settings data 410 can only be modified by the owner of the application state 400 and not subsequent user accounts that the application state 400. In other embodiments, the permission settings data 410 are layered such that each subsequent user of the application state 400 can add additional permission restrictions without affecting the permission restrictions created by a previous user of the application state 400.

Figure 5A:
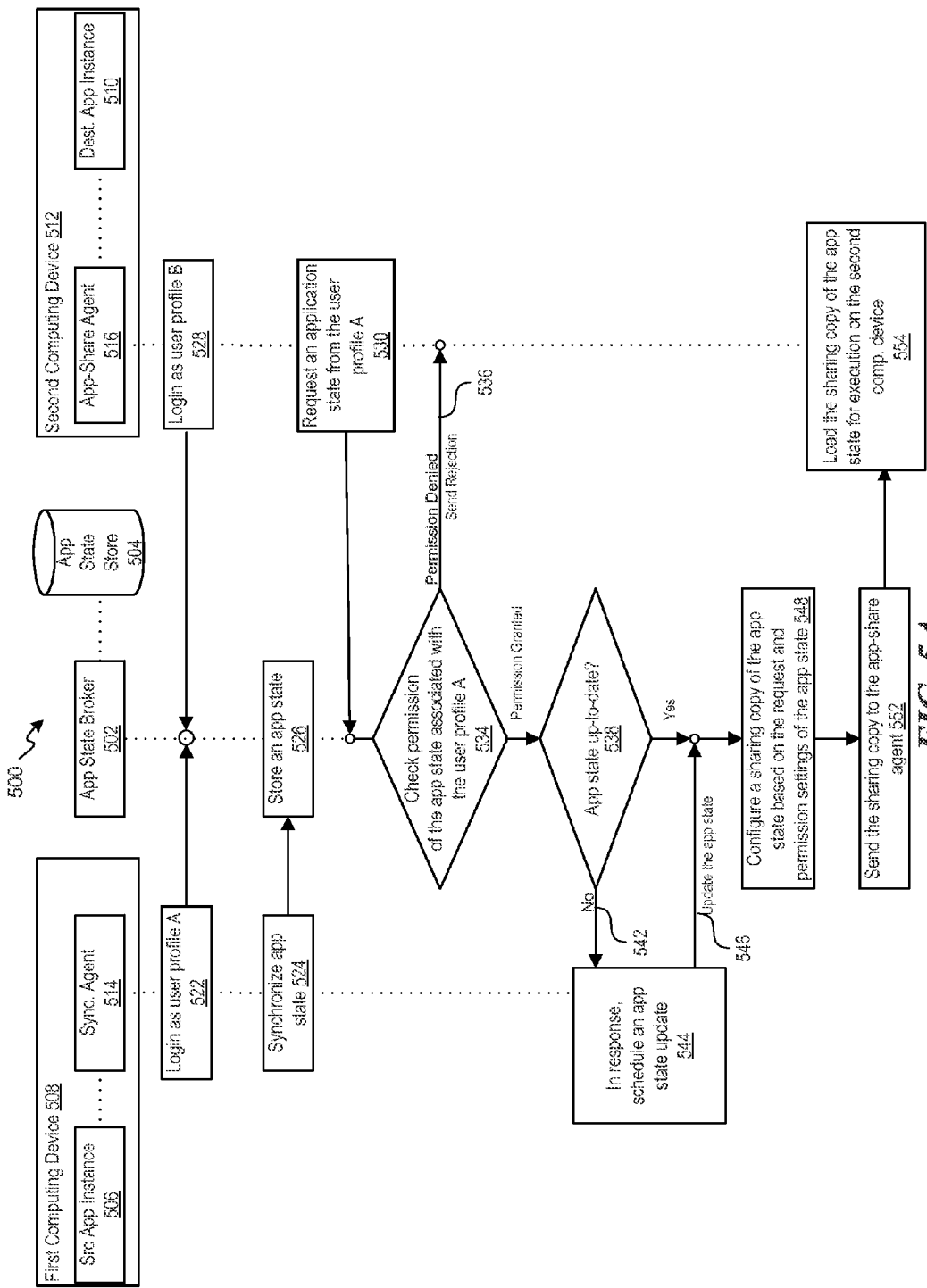
FIG. 5A is a first portion of an activity diagram illustrating a method of sharing an application state of a computer application between computing devices, in accordance with various embodiments.
Figure 5B:
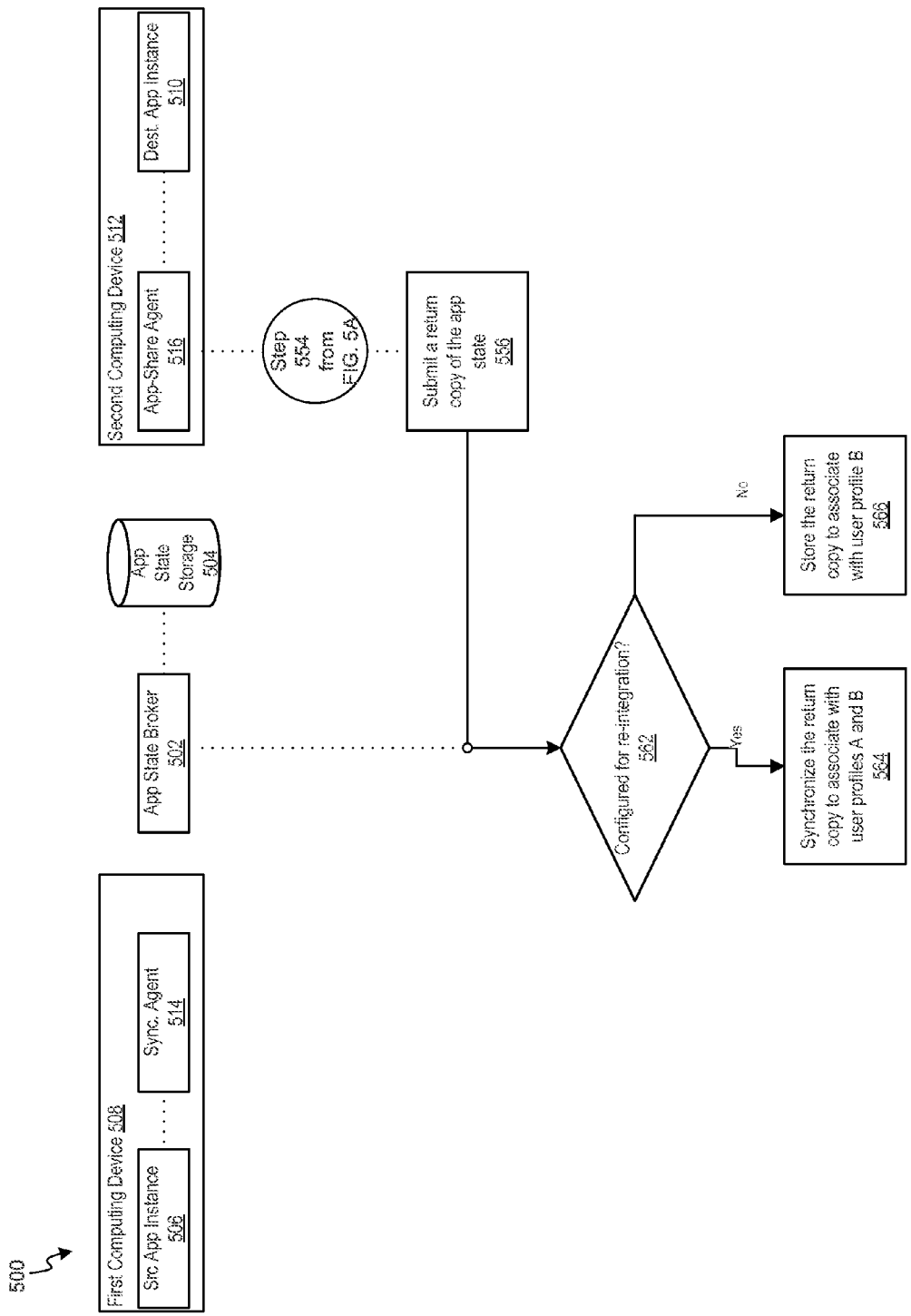
FIG. 5B is a second portion of the activity diagram of FIG. 5A.

FIG. 5A and FIG. 5B are portions of an activity diagram illustrating a method 500 of sharing an application state of a computer application between computing devices, in accordance with various embodiments. Each of the computing devices can be the computing device 200 of FIG. 2. The method 500 involves an application state broker system 502 (e.g., the cloud storage service 110 of FIG. 1, the application share module 230 of FIG. 2, or the application state broker system 312 of FIG. 3) that manages an application state storage 504. The application state storage 504 can be one or more data storage devices directly accessible by the application state broker system 502, a cloud-based storage service provided by or connected to the application state broker system 502, or a peer-to-peer storage service provided by or connected to the application state broker system 502. The application state broker system 502 can facilitate sharing of an application state from a source application instance 506 of an application installed on a first computing device 508 to a destination application instance 510 of the application on a second computing device 512. In embodiments, the source application instance 506 can execute on the same computing device as the destination application instance 510. That is, the first computing device 508 can be the second computing device 512. In other embodiments, the source application instance 506 and the destination application instance 510 execute on different computing devices.

The first computing device 508 can execute a synchronization module 514, such as the state synchronization module 220 of FIG. 2. The second computing device 512 can execute an app-share module 516, such as the application share module 230 of FIG. 2.

In step 522, the synchronization agent 514 can log into the application state broker system 502 as user profile A. In response, the application state broker system 502 can authenticate the user profile A. Sometimes later in step 524, the synchronization agent 514 can update application data associated with an application state to the application state broker system 502. Subsequently, in step 526, the application state broker system 502 can store the application data as the application state for the user profile A.

The app-share agent 516 can log into the application state broker system 502 as user profile B in step 528. In response, the application state broker system 502 can authenticate the user profile B. In step 530, the app-share agent 516 can request an application state from the user profile A. The activities of the app-share agent 516 in steps 528 and 530 can be independent from the activities of the synchronization agent 514. That is, the synchronization agent 514 independently backs up application states for the user profile A in accordance with a schedule or a condition configured by the user profile A without any input from the user profile B.

In step 534, the application state broker system 502 can verify permission settings for the application state associated with the user profile A to determine whether the user profile B is allowed to load the application state. If permission is denied to the user profile B, then the application state broker system 502 can send a rejection message to the app-share agent 516. If permission is granted, the application state broker system 502 can check, in step 538, whether the application state in the application state storage 504 is up-to-date.

In some embodiments, if the application state is not up-to-date, then the application state broker system 502 sends, in step 542, an update request to the synchronization agent 514. In response, the synchronization agent 514 can schedule, in step 544, an application state update. In step 546, the synchronization agent 514 can update the application state to the application state broker system 502.

In step 548, the application state broker system 502 configures a sharing copy of the application state based on the request from the app-share agent and the permission settings of the application state. For instance, this configuration may include transforming the application state to be compatible with an operating system of the second computing device 512 that is associated with the second user profile. The operating system of the second computing device 512 may be a different operating system or at least a different version of operating system than the operating system of the first computing device 508.

For example, the application state broker system 502 can configure whether the sharing copy is sharable to a third computing device. As another example, the application state broker system 502 can configure whether new application data, generated after executing the sharing copy of the target application, is to re-integrate with the application data of the application state associated with the user profile A in the application state storage 504. The application state broker system 504 can further configure whether new application data, generated after executing the sharing copy of the target application, is to synchronize to a new application state associated with the user profile B in the application state storage 504. The new application state can also be associated with the user profile A as well. In embodiments, the application state broker system 504 can configure the sharing copy as a session-only instance of the target application that expires in accordance with a schedule or a condition that can be met while executing the session-only instance.

In step 552, the application state broker system 502 can send the sharing copy to the app-share agent 516. Then in step 554, the app-share agent 516 can load the sharing copy of the application state for execution on the second computing device 512.

After step 554, the app-share agent 516 can submit a return copy of the application state back to the application state broker system 502. In response, the application state broker system 502 can determine, in step 562, whether the application state is configured for re-integration with the application state that is originally associated with the user profile A in the application state storage 504. If the application state is configured for re-integration, the return copy is synchronized, in step 564, to associate with devices of both the user profiles A and B. If the application state is not configured for re-integration, the return copy is stored, in step 566, in the application state storage 504 to associate with the user profile B.

Figure 6:
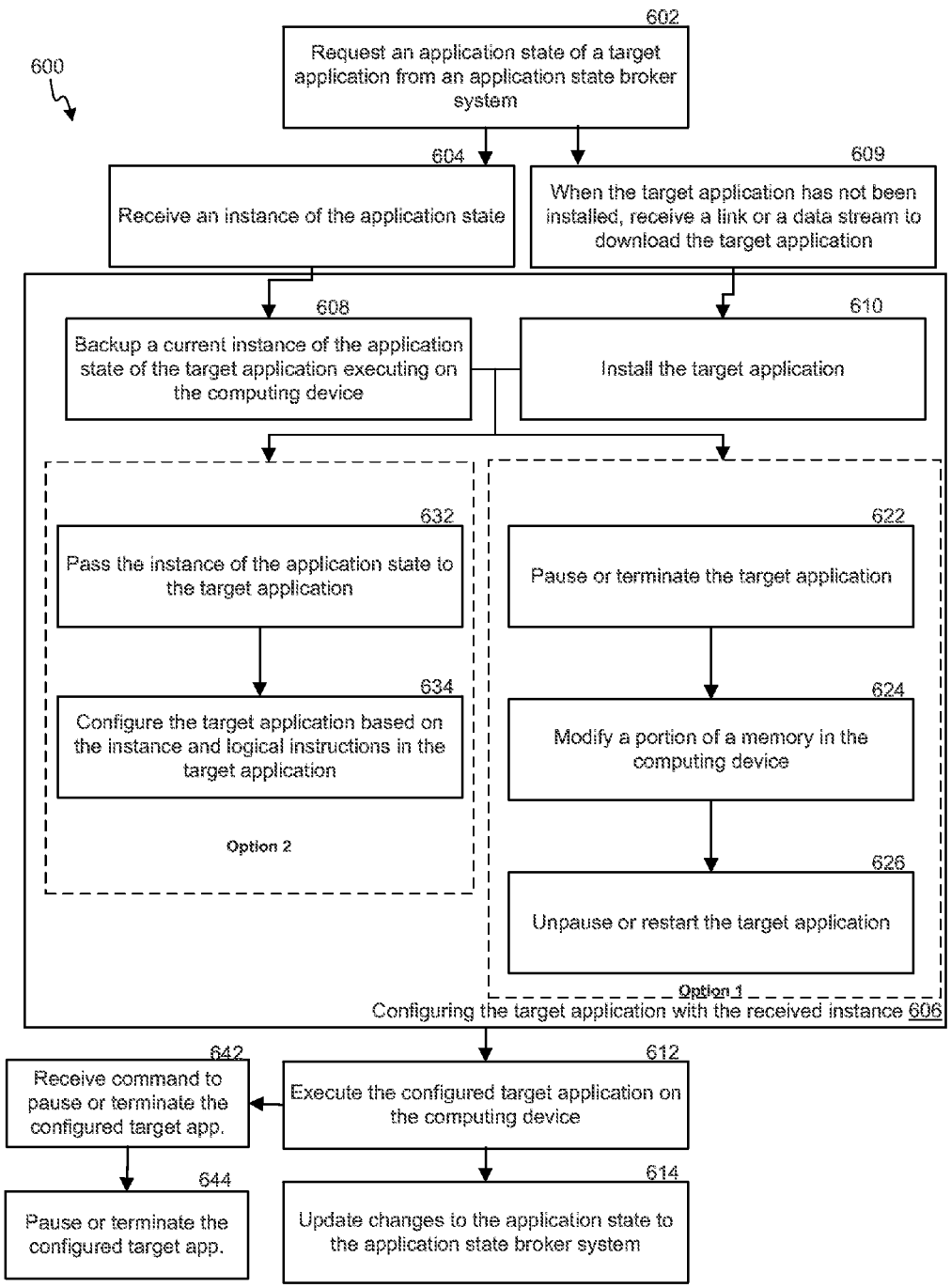
FIG. 6 is a flow chart illustrating a method of loading an instance of an application state of a target application into a computing device, in accordance with various embodiments.

FIG. 6 is a flow chart illustrating a method 600 of loading an instance of an application state of a target application into a computing device (e.g., the second computing device 512 of FIG. 5), in accordance with various embodiments. For example, the computing device can be the computing device 200 of FIG. 2. The method 600 begins with an app-share agent (e.g., the application share module 230 of FIG. 2) of the computing device requesting, in step 602, an application state of the target application from an application state broker system. Prior to step 602, the computing device can provide authentication information to the application state broker system to authenticate a current user profile operating from the computing device. The application state is associated with a foreign user profile different from a current user profile logged into the computing device.

The application state broker system, for example, can be the cloud storage service 110 of FIG. 1, the application share module 230 of FIG. 2, or the application state broker system 312 of FIG. 3, the application state broker system 502 of FIG. 5, or one or more computing devices implementing the services and functionalities described for the cloud storage service 110 or the application state broker system 312. The application state broker system can maintain an application state storage that stores one or more application states associated with one or more user profiles. The application state requested in step 602 can be the application state 400 of FIG. 4.

In response to the request, the application state broker system can send an instance of the application state to the computing device. That is, the computing device receives an instance of the application state from the application state broker system in step 604. The sharing instance may be configured with limited permission to load the application state in the first computing device for execution (e.g., based on the permission settings data 410 of FIG. 4).

Upon receiving the instance of the application state, the app-share agent configures, in step 606, the target application with the instance of the application state for executing on an operating system of the computing device. Optionally, step 606 can include determining, while initiating the configuration, whether to back up a current instance of the target application installed on the first computing device. Based on the determination, the app-share agent can back up the current instance of the application state in sub step 608. For example, the current instance can be stored locally on the computing device. In addition to or instead of storing the current instance locally, the app-share agent can send application data associated with the current instance to the application state broker system to backup the application state of the current instance. In various embodiments, the received instance of the application state can be configured as a session-only instance that expires in accordance with a schedule or a condition. The current instance, backed up in step 606, can be used to re-configure the target application to load the current instance of the application state after the received instance of the application state expires.

Also optionally, after the application state of the target application has been requested in step 602 and when the target application has not been installed on an operating system of the computing device, the application state broker system sends and the computing device receives, in step 609, a link or a data stream to download the target application. Then in sub step 610 of step 606, the app-share agent can initiate an installation of the target application based on the link or the data stream. This feature can enable a convenient single-step application sharing mechanism for a user account to borrow an application from another user account even when the user account does not possess the application on his/her device.

In embodiments, the app-share agent can merge the received instance of the application data with the current instance already on the first computing device. For example, the app-share agent can use the hardware configuration data of the current instance and the application memory data of the received instance to load the target application. The merging can be performed by segmenting the application state into functional portions (e.g., the components of the application state 400 of FIG. 4) and by assigning a first functional portion to load from the received instance and a second functional portion to load from the current instance.

Once step 606 is completed, either the user of the computing device can manually or the app-share agent can automatically execute the configured target application on the operating system of the computing device in step 612. After the configured target application has been executed, a synchronization agent (e.g., the state synchronization module 136 of FIG. 1 or the state synchronization module 220 of FIG. 2) can update changes to the application state of the configured target application back to the application state broker system in step 614.

Various methods of configuring the target application are contemplated in this disclosure. In some embodiments, the configuration of the target application is transparent to the target application. For example, step 606 can include: pausing or terminating the target application in sub-step 622; modifying a portion of a memory allotted for the target application in the computing device in sub-step 624; and unpausing or restarting the target application in sub-step 626. In other embodiments, the target application includes built-in logic to facilitate loading of an instance of a new application state. For example, step 606 can include: passing the instance of the application state to the target application in sub-step 632; and configuring the target application based on the instance of the application state and logical instructions within the target application in sub-step 634. In sub-step 632, the app-share agent can pass the instance of the application state to the target application while the target application is executing on the computing device. Alternatively, the app-share agent can initialize the target application with the instance of the application state if the target application is not running on the computing device (e.g., sending the instance of the application state while initiating the target application).

In some embodiments, the foreign user profile can retain some control over the received instance of the application state. For example, in step 642, the computing device can receive a command to pause or terminate the configured target application from the application state broker system. This command can be in response to the foreign user profile changing a permission setting of the application state or in response to the foreign user profile synchronously modifying the application state. In response, the computing device can pause or terminate the configured target application in step 644.

Figure 7:
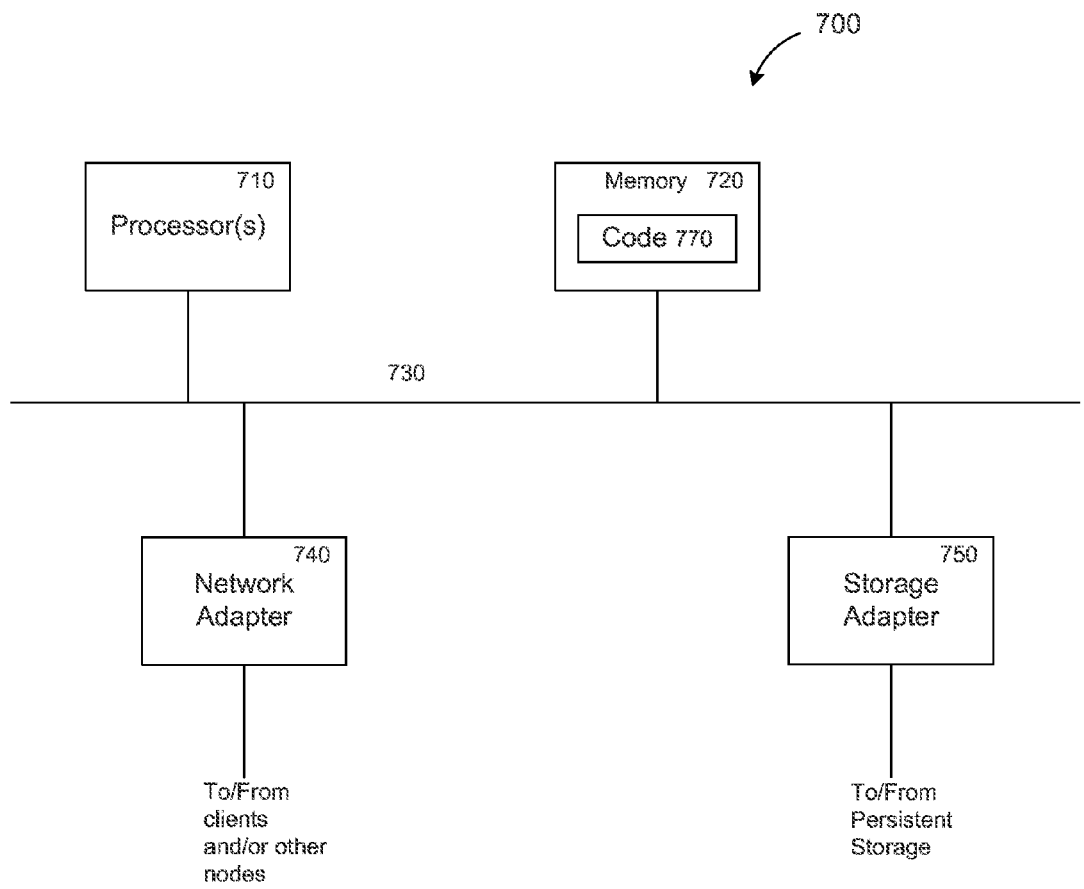
FIG. 7 is a block diagram of an example of a computing device, which may represent one or more computing device or server described herein.

FIG. 7 is a block diagram of an example of a computing device 700, which may represent one or more computing device or server described herein. The computing device 700 includes one or more processors 710 and memory 720 coupled to an interconnect 730. The interconnect 730 shown in FIG. 7 is an abstraction that represents any one or more separate physical buses, point-to-point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 710 is/are the central processing unit (CPU) of the computing device 700 and thus controls the overall operation of the computing device 700. In certain embodiments, the processor(s) 710 accomplishes this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), the like, or a combination of such devices.

The memory 720 is or includes the main memory of the computing device 700. The memory 720 represents any form of random access memory (RAM), read-only memory (ROM), flash memory, the like, or a combination of such devices. In use, the memory 720 may contain a code 770 containing instructions according to the technology disclosed herein.

Also connected to the processor(s) 710 through the interconnect 730 are a network adapter 740 and a storage adapter 750. The network adapter 740 provides the computing device 700 with the ability to communicate with remote devices, over a network and may be, for example, an Ethernet adapter or Fibre Channel adapter. The network adapter 740 may also provide the computing device 700 with the ability to communicate with other computers. The storage adapter 750 allows the computing device 700 to access a persistent storage, and may be, for example, a Fibre Channel adapter or SCSI adapter.

The code 770 stored in memory 720 may be implemented as software and/or firmware to program the processor(s) 710 to carry out actions described above. In certain embodiments, such software or firmware may be initially provided to the computing device 700 by downloading it from a remote system through the computing device 700 (e.g., via network adapter 740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

Figure 8:
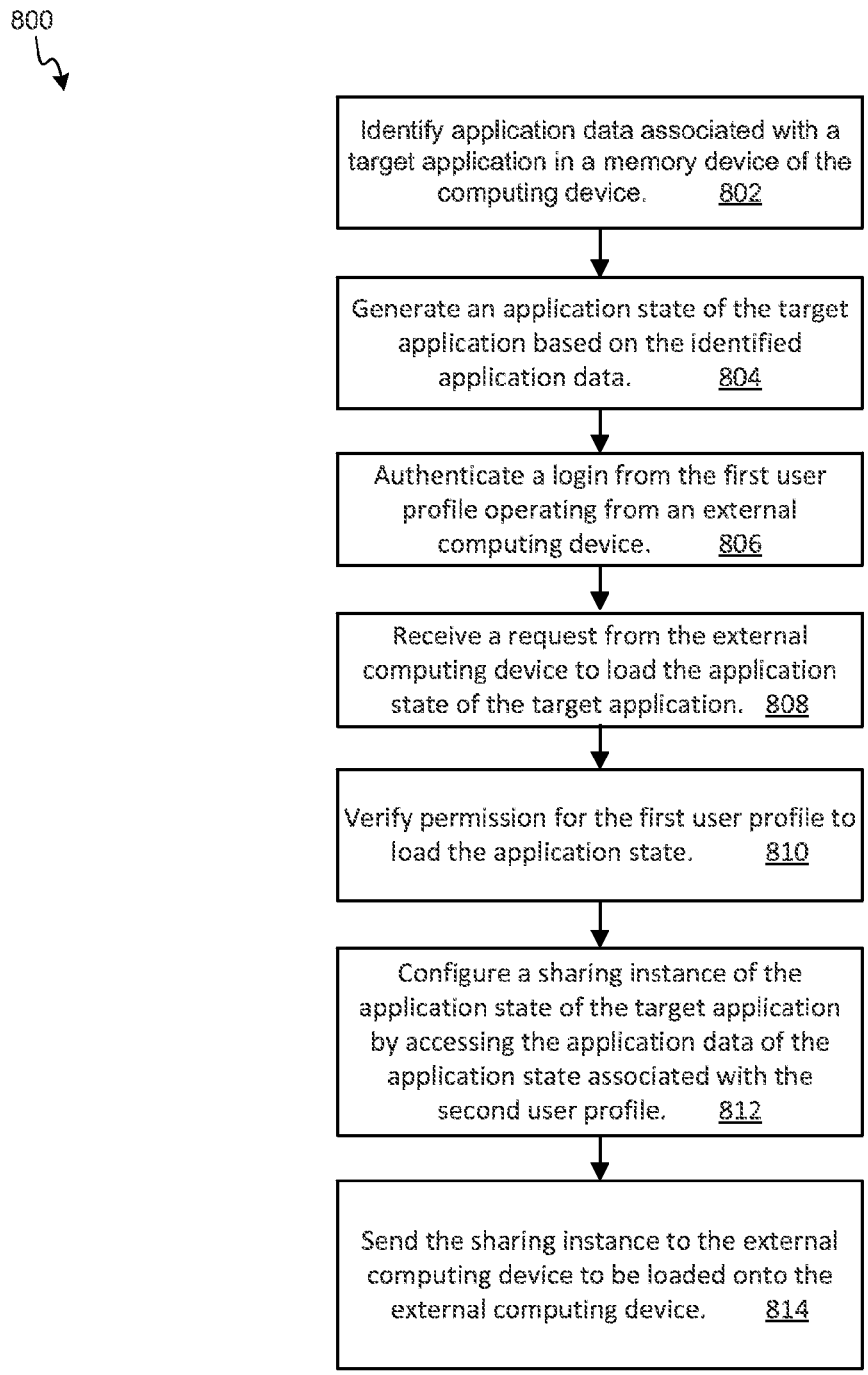
FIG. 8 is a flow chart illustrating a method of brokering application states between user profiles, in accordance with various embodiments.

FIG. 8 is a flow chart illustrating a method 800 of brokering application states between user profiles, in accordance with various embodiments. The method 800 can be a computer-implemented method of operating a computing device as an application state broker agent to facilitate application state sharing between at least a first user profile and a second user profile. The method 800 begins in step 802 to identify application data (e.g., gameplay state data in the case of a computer game application) associated with a target application in a memory device of the computing device. The application data can be associated with the first user profile. Then in step 804, the computing device generates an application state of the target application based on the identified application data. The computing device authenticates, in step 806, a login from the second user profile operating from an external computing device.

Then, the computing device can receive a request from the external computing device to load the application state of the target application in step 808. The computing device can verify, in step 810, permission for the second user profile to load the application state owned by the first user profile against permission settings configured by the first user profile and associated with the application state. In step 812, the computing device configures a sharing instance of the application state of the target application by accessing the application data of the application state associated with the first user profile. For example, this configuration may include transforming the application state to be compatible with an operating system of the external computing device that is associated with the second user profile. The operating system of the external computing device may be a different operating system or at least a different version of operating system than the operating system of the computing device. Once configured, the computing device sends, in step 814, the sharing instance to the external computing device to be loaded onto the external computing device.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel or may be performed at different times.

Figure 9A:
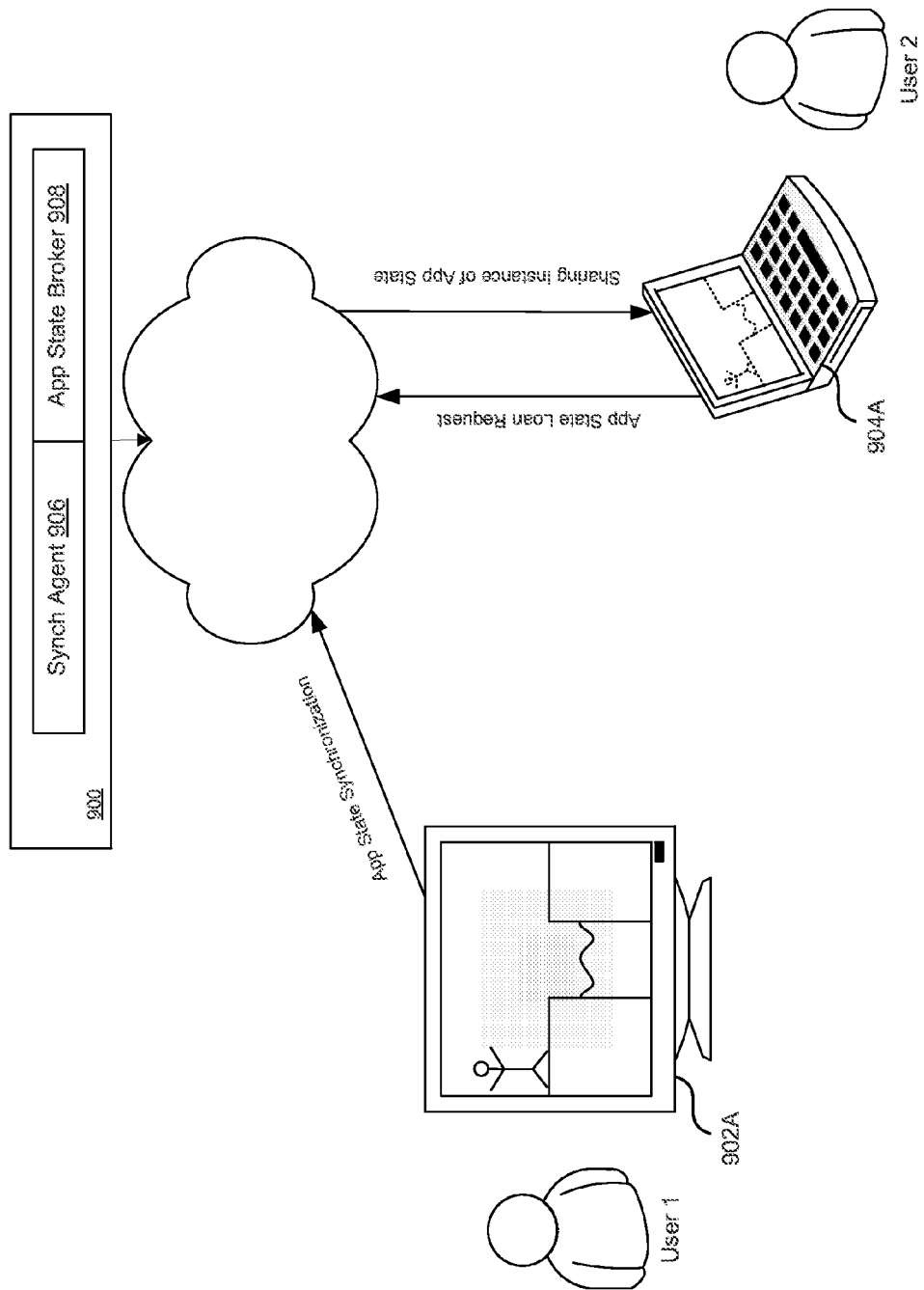
FIG. 9A is a diagram illustrating an example of an application sharing system, in accordance with various embodiment.

FIG. 9A is a diagram illustrating an example of an application sharing system 900, in accordance with various embodiments. The application sharing system 900 can be the cloud storage service 110 of FIG. 1, the application state broker 312 of FIG. 3, or the application state broker system 502 of FIG. 5. The application sharing system 900 enables a first computing device 902A (e.g., a tablet as illustrated) to lend an application state (e.g., the application state 400 of FIG. 4) to a second computing device 904A (e.g., a laptop as illustrated). The first computing device 902A and the second computing device 904A can have different operating systems. For example, the first computing device 902A can have an Android operating system and the second computing device 904A can have a Windows operating system.

In the illustrated example, a computer game is being played on the operating system of the first computing device 902A. The application sharing system 900 can extract application state data (e.g., gameplay data) from the computer game during run-time. For example, a synchronization agent 906 of the application sharing system 900 can periodically extract the application state data. In another example, whenever a condition of the execution of the computer game is met during run-time, the synchronization agent 906 can perform the extraction of the application state data. In other instances, the synchronization schedule of application state data between the synchronization agent 906 and the first computing device 902A is determined manually by either an operator of the synchronization agent 906 or of the first computing device 902A.

The application sharing system 900 can also include an app state broker agent 908 (e.g., part of the application state broker system 312 of FIG. 3). The app state broker agent 908 provides a service to enable user profiles to borrow application states (e.g., gameplay states) from other user profiles. For example, the first computing device 902A can be associated with at least a first user profile. The synchronization agent 906 can generate an application state associated with the first user profile based on extraction of the application state data at time T.

The second computing device 904A can be associated with at least a second user profile. The second user profile 916 can request the application state owned by and associated with the first user profile from the application state broker agent 908. The app state broker agent 908 can configure a sharing instance of the application state to be compatible to run on the operating system of the second computing device 904A. The app state broker agent 908 can then send the sharing instance to the second computing device 904A to be loaded. As shown in dotted lines, the second computing device 904A can load the sharing instance of the application state of the computer game such that a new running instance of the computer game can run on the operating system of the second computing device 904A. The sharing instance is loaded in a manner such that the new running instance picks up where the first user profile 912 left off at time T on the first computing device 902A.

Figure 9B:
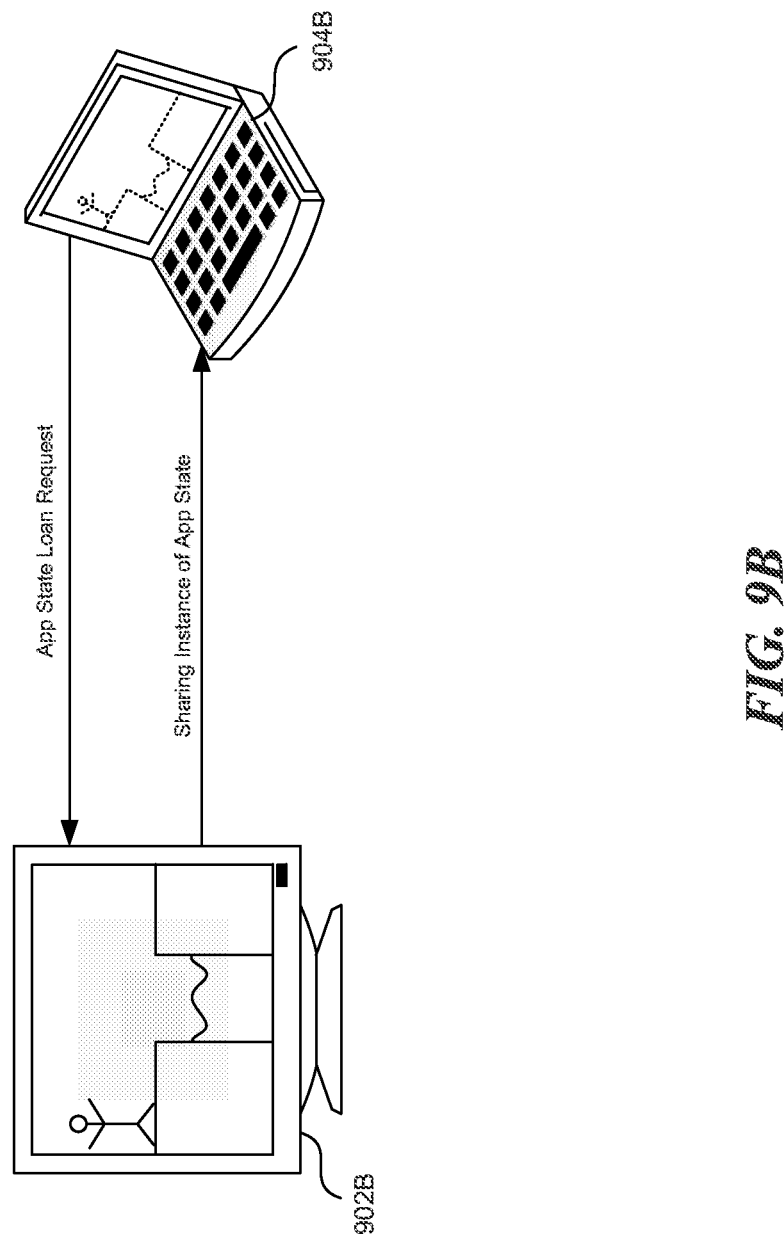
FIG. 9B is a diagram illustrating an example system environment of implementing user devices capable of sharing application states directly with each other, in accordance with various embodiments.

FIG. 9B is a diagram illustrating an example system environment of implementing user devices (e.g., a first computing device 902B and a second computing device 904B) capable of sharing application states directly with each other, in accordance with various embodiments. The example system environment illustrates the first computing device 902B directly sharing its application state with the second computing device 904B. For example, this feature can be implemented by an app-share agent, such as the application share module 230, running within the user devices. The app-share agent in the user devices can serve the functionalities of the app state broker agent 908 of the application sharing system 900. For example, the app-share agent of the second computing device 904B can request the application state from the first computing device 902B. The app-share agent of the first computing device 902B can respond to the request by configuring a sharing instance of the application state that is compatible with the operating system of the second computing device 904B.

References in this specification to "an embodiment," "one embodiment," or the like mean that the particular feature, structure, or characteristic being described is included in at least one embodiment of the present disclosure. Occurrences of such phrases in this specification do not all necessarily refer to the same embodiment, however. In addition to the above mentioned examples, various other modifications and alterations of the disclosed technology may be made. Accordingly, the above disclosure is not to be considered as limiting, and the appended claims are to be interpreted as encompassing the true spirit and the entire scope of the disclosure.

What is claimed is:

1. A computer-implemented method of operating an application state broker system to facilitate application state sharing between at least a first user profile and a second user profile, comprising:

receiving application data associated with a time point and a first instance of a target application installed on a first computing device, wherein the application data, when loaded in another device other than the first computing device, enables the other device to configure another instance of the target application as if the first instance of the target application that was running at the time point is continuing to run on the other device without any appearance of time lapse within a user environment provided by the target application, wherein the application data is associated with the first user profile and wherein the application data includes permission setting data associated with application state sharing;

generating an application state of the target application to store in a storage service based on the received application data;

authenticating a login from the second user profile operating from a second computing device;

receiving a request from the second computing device to load the application state of the target application, wherein the application state is owned by the first user profile according to the storage service;

verifying permission for the second user profile to load the application state owned by the first user profile against the permission settings associated with the application state;

configuring a sharing instance of the application state of the target application by accessing the application data of the application state associated with the first user profile in the storage service; and sending the sharing instance to the second computing device to be loaded onto the second computing device.

2. The computer-implemented method of claim 1, wherein receiving the application data and generating the application state are based on an application state synchronization process to backup application states for the first user profile, wherein the application state synchronization process is independent of the request from the second computing device to load the application state.

3. The computer-implemented method of claim 1, further comprising:

in response to receiving the request, determining that the target application is not installed on the second computing device; and providing the target application or a link to the target application to the second computing device.

4. The computer-implemented method of claim 1, further comprising authenticating the first user profile operating from a first computing device prior to receiving the application data associated with the target application.

5. The computer-implemented method of claim 1, further comprising:

prior to configuring the sharing instance, determining whether the application state stored in the storage service is up-to-date;

requesting additional application data from the first computing device in response to determining that the application state in the storage service is not up-to-date; and in response to receiving the additional application data, updating the application state of the target application based on the received additional application data before configuring the sharing instance that is to be loaded onto the second computing device.

6. The computer-implemented method of claim 1, further comprising:

after sending the sharing instance, receiving new application data from the second computing device with updates to the application state of the target application; and updating the application state associated with the first user profile in the storage service with the new application data from the second computing device.

7. The computer-implemented method of claim 1, further comprising:

after sending the sharing instance, receiving new application data from the second computing device with updates to the application state of the target application; and generating another application state for the target application to store in the storage service based on the received application data, wherein the other application state is associated with the second user profile.

8. The computer-implemented method of claim 7, wherein the other application state is also associated with the first user profile.

9. The computer-implemented method of claim 1, wherein configuring the sharing instance of the application state includes configuring whether the sharing instance is sharable to a third computing device.

10. The computer-implemented method of claim 1, wherein configuring the sharing instance of the application state includes configuring whether new application data, generated after executing the sharing instance of the target application in the second computing device, is to re-integrate into the application state associated with the first user profile in the storage service.

11. The computer-implemented method of claim 1, wherein configuring the sharing instance of the application state includes configuring whether new application data, generated after executing the sharing instance of the target application in the second computing device, is to synchronize with a new application state, in the storage service, associated with the second user profile.

12. The computer-implemented method of claim 1, wherein configuring the sharing instance of the application state includes configuring the sharing instance as a session-only instance of the target application that expires in accordance with a schedule.

13. The computer-implemented method of claim 1, wherein configuring the sharing instance of the application state includes configuring the sharing instance as a session-only instance of the target application that expires when a condition is met while executing the session-only instance.

14. The computer-implemented method of claim 1, wherein the storage service is implemented by one or more data storage devices directly accessible to the application state broker system, by a cloud-based storage service, or by a peer-to-peer storage service.

15. The computer-implemented method of claim 1, wherein receiving the application data includes receiving the application data that represents a differential update from a previously received application data of the target application stored in the storage service.

16. A computer server system comprising:

a memory storing executable instructions implementing an application state broker agent to facilitate application state sharing between at least a first user profile and a second user profile;

a processor configured by the executable instructions to:

receive application data associated with a target application installed on a first computing device, wherein the application data is associated with the first user profile and wherein the application data includes permission setting data associated with application state sharing;

generate an application state of the target application to store in a storage service based on the received application data;

authenticate a login from the second user profile operating from a second computing device;

receive a request from the second computing device to load the application state of the target application, wherein the application state is owned by the first user profile according to the storage service;

verify permission for the second user profile to load the application state owned by the first user profile against the permission settings associated with the application state;

configure a sharing instance of the application state of the target application by accessing the application data of the application state associated with the first user profile in the storage service; and send the sharing instance to the second computing device to be loaded onto the second computing device.

17. The computer server system of claim 16, wherein receiving the application data and generating the application state are based on an application state synchronization process to backup application states for the first user profile, wherein the application state synchronization process is independent of the request from the second computing device to load the application state.

18. The computer server system of claim 16, wherein the executable instructions further comprise:
prior to configuring the sharing instance, determine whether the application state stored in the storage service is up-to-date;
request additional application data from the first computing device in response to determining that the application state in the storage service is not up-to-date; and
in response to receiving the additional application data, update the application state of the target application based on the received additional application data before configuring the sharing instance that is to be loaded onto the second computing device.

19. The computer server system of claim 16, wherein the executable instructions further comprise:
after sending the sharing instance, receive new application data from the second computing device with updates to the application state of the target application; and
update the application state associated with the first user profile in the storage service with the new application data from the second computing device.

20. The computer server system of claim 16, further comprising:
after sending the sharing instance, receive new application data from the second computing device with updates to the application state of the target application; and
generate another application state for the target application to store in the storage service based on the received application data, wherein the other application state is associated with the second user profile.

21. The computer server system of claim 16, wherein configuring the sharing instance of the application state includes configuring whether the sharing instance is sharable to a third computing device.

22. The computer server system of claim 16, wherein configuring the sharing instance of the application state includes configuring whether new application data, generated after executing the sharing instance of the target application in the second computing device, is to re-integrate into the application state associated with the first user profile in the storage service.

23. The computer server system of claim 16, wherein configuring the sharing instance of the application state includes configuring the sharing instance as a session-only instance of the target application that expires when a condition is met while executing the session-only instance.

24. A non-transitory computer-readable storage medium storing computer-executable instructions, comprising:
instructions for receiving, at a computing system, application data associated with a time point and a first instance of a target application installed on a first computing device, wherein the application data, when loaded in another device other than the first computing device, enables the other device to configure another instance of the target application as if the first instance of the target application that was running at the time point is continuing to run on the other device without any appearance of time lapse within a user environment provided by the target application, wherein the application data is associated with the first user profile and wherein the application data includes permission setting data associated with application state sharing;
instructions for generating, by the computing system, an application state of the target application to store in a storage service based on the received application data;
instructions for authenticating, by the computing system, a login from the second user profile operating from a second computing device;
instructions for receiving, by the computing system, a request from the second computing device to load the application state of the target application, wherein the application state is owned by the first user profile according to the storage service;
instructions for verifying, by the computing system, permission for the second user profile to load the application state owned by the first user profile against the permission settings associated with the application state;
instructions for configuring, by the computing system, a sharing instance of the application state of the target application by accessing the application data of the application state associated with the first user profile in the storage service; and
instructions for sending, by the computing system, the sharing instance to the second computing device to be loaded onto the second computing device.

25. The non-transitory computer-readable storage medium of claim 24, wherein receiving the application data and generating the application state are based on an application state synchronization process to backup application states for the first user profile, wherein the application state synchronization process is independent of the request from the second computing device to load the application state.

26. The non-transitory computer-readable storage medium of claim 24, further comprising instructions for authenticating, by the computing system, the first user profile operating from a first computing device prior to receiving the application data associated with the target application.

27. The non-transitory computer-readable storage medium of claim 24, further comprising:
prior to configuring the sharing instance, instructions for determining, by the computing system, whether the application state stored in the storage service is up-to-date;
instructions for requesting, by the computing system, additional application data from the first computing device in response to determining that the application state in the storage service is not up-to-date; and
in response to receiving the additional application data, instructions for updating, by the computing system, the application state of the target application based on the received additional application data before configuring the sharing instance that is to be loaded onto the second computing device.

28. The non-transitory computer-readable storage medium of claim 24, further comprising:
after sending the sharing instance, instructions for receiving, by the computing system, new application data from the second computing device with updates to the application state of the target application; and
instructions for updating, by the computing system, the application state associated with the first user profile in the storage service with the new application data from the second computing device.

29. The non-transitory computer-readable storage medium of claim 24, further comprising:
- after sending the sharing instance, instructions for receiving, by the computing system, new application data from the second computing device with updates to the application state of the target application; and
- instructions for generating, by the computing system, another application state for the target application to store in the storage service based on the received application data, wherein the other application state is associated with the second user profile.

30. The non-transitory computer-readable storage medium of claim 24, wherein configuring the sharing instance of the application state includes configuring whether new application data, generated after executing the sharing instance of the target application in the second computing device, is to re-integrate into the application state associated with the first user profile in the storage service.

\* \* \* \* \*